United States Patent [19]

Endres et al.

[11] Patent Number: 4,985,476

[45] Date of Patent: Jan. 15, 1991

[54] RTV 1K COMPOSITIONS WHICH ARE STABLE IN STORAGE IN THE ABSENCE OF MOISTURE AND FORM ELASTOMERS WHICH CAN BE PAINTED

[75] Inventors: Robert Endres, Bergisch-Gladbach; Wilhelm Weber; Krystyna Preuss, both of Leverkusen, all of Fed. Rep. of Germany

[73] Assignee: Bayer Aktiengesellschaft, Leverkusen-Bayerwerk, Fed. Rep. of Germany

[21] Appl. No.: 422,681

[22] Filed: Oct. 17, 1989

[30] Foreign Application Priority Data

Oct. 29, 1988 [DE] Fed. Rep. of Germany ....... 3836916

[51] Int. Cl.$^5$ .............................................. C08K 9/10
[52] U.S. Cl. .................................... 523/210; 523/212; 523/204; 524/267; 524/425; 524/788; 524/731; 528/17
[58] Field of Search .................. 528/17; 524/425, 267, 524/788, 731; 523/204, 212, 210

[56] References Cited

U.S. PATENT DOCUMENTS 3,689,454 9/1972 Smith et al. ............................ 528/17
4,826,915 5/1989 Stein et al. ............................. 528/17

Primary Examiner—Melvyn I. Marquis

[57] ABSTRACT

Polydiorganosiloxane compositions which are stable in storage with exclusion of moisture and which are curable with water or atmospheric air are useful to produce paintable joint sealing compounds and coating composition and the composition is a mixture of $\alpha, \omega$-dihydroxy-polydiorganosiloxanes, carboxylic acid amido alkylalkoxy silicon compounds as cross-linking agents, complex titanic acid esters and filler which comprises a precipitated, hydrophobicized chalk whose residual moisture has been removed before contact with the titanic acid esters and cross-linking agents in the mixture.

14 Claims, No Drawings

RTV 1K COMPOSITIONS WHICH ARE STABLE IN STORAGE IN THE ABSENCE OF MOISTURE AND FORM ELASTOMERS WHICH CAN BE PAINTED

This invention relates to silicone-based one-component compositions which are stable in storage and undergo cross-linking at room temperature and which give rise, when cured in a moist atmosphere, to elastomers which can be painted with very firm adherence of the lacquer. Such elastomers may be used in the building industry as joint sealants, e.g. for sealing of the joints of sanitary ware, floors and walls or for sealing the gaps between window panes and window frames or between the frames and the wall.

BACKGROUND OF THE INVENTION

Silicone sealing compounds which can be cross-linked by the moisture in the atmosphere generally consist of α,ω-dihydroxypolydiorganosiloxanes and silicone oils optionally mixed with precipitated or pyrogenic silicas, powdered quartz, diatomaceous earth, dolomite powder, chalk, zinc oxide and other fillers. When organic silicon compounds containing more than two reactive groups and capable of reacting both with silanol groups and with water are added to such systems (the said reactions generally being accelerated by catalysts such as titanic acid esters and heavy metal salts) and all access to moisture is excluded, then the products obtained are stable in storage and undergo cross-linking to silicone elastomers only when exposed to the moisture in the atmosphere.

Such RTV-1K systems may be used as joint sealants, as already mentioned. The so called neutral system based on carboxylic acid amido alkyl alkoxysilanes as described e.g. in DE-PS 1 247 646 and in DE-PS 1 258 08has proved to be particularly satisfactory but these sealing compounds cannot be coated with lacquers as is frequently necessary in the building industry.

Systems based on carboxylate silanes which can be painted are described in US-PS 3 957 714 and US-PS 4 293 616, the systems described in the first mentioned specification being prepared from needle shaped calcium carbonate with the addition of solvent and those described in the second specification being prepared from coated and ground chalks with the addition of polyethers. The elastomers obtained, however, are greatly altered in their mechanical properties, i.e. they have a high modulus of elasticity, high shore A hardness and low elongation at break, and they undergo volumetric shrinkage and are limited in their capacity to take coats of lacquer. The latter also applies to the systems according to EP 43 501, which can easily be brush coated with paint one to three days after application of the sealing compound but if paint is to be applied at a later date the surface of the sealing compound must first be cleaned with solvents.

BRIEF DESCRIPTION OF THE INVENTION

The disadvantages mentioned above may be overcome by the present invention. The invention relates to polydiorganosiloxane compositions which are stable in storage in the absence of moisture and can be cured by the action of water or atmospheric air at the ambient temperature to form low molecular weight elastomers with high elongation and ultimate strength. These polydiorganosiloxane compositions are obtainable by the mixing of α,ω-dihydroxypolydiorganosiloxanes and α,ω-bis-(triorganylsiloxy)-polyorganosiloxanes with carboxylic acid amido alkylalkoxy silicon compounds which serve as cross-linking agents and complex titanic acid esters as well as fillers and optionally pigments and heavy metal salts which accelerate cross-linking, characterized in that precipitated, hydrophobicized chalk in which the residual moisture content has been reduced to less than 0.15% before the addition of titanic acid esters and cross-linking agents is used as filler.

DETAILED DESCRIPTION OF THE INVENTION

It was surprisingly found that sealing compounds prepared as described above can still be coated with ordinary commercial lacquers after several weeks. If the sealing compound is still free from dirt on the surface at the end of this time, the lacquer coat may be applied without any preliminary treatment such as cleaning. The lacquers used may be priming lacquers or top coat lacquers based on alkyd resins, polyurethanes, polyacrylates, polystyrenes, polyvinyl acetates or polyvinyl propionates and they may be applied either as solvent systems or as aqueous dispersion systems. The lacquer adheres very firmly after it has hardened right through. One very interesting variation, particularly for use in rooms liable to have a high moisture content (bathroom, shower, sauna area, etc.) is the possibility of using lacquers containing fungicidal additives. Since the sealing compounds according to the invention remain paintable even after they have been completely cured and beyond that time, it is now possible to renew the lacquer at the intervals required for renewing the fungicidal activity.

The problem of fungal attack of sealed joints in moist rooms after a period of about two years can therefore now be overcome by renewing the coat of paint. This inevitably results in a longer service life of the sealed joints.

The polymers used for the preparation of the RTV-1K compositions according to the invention are preferably α,ω-dihydroxypolydiorganosiloxanes containing mainly methyl groups and having a viscosity at 20° C. of from 1000 to 1,000,000 mPas, most preferably from 10,000 to 300,000 Pas. The concentration of the polymer should be from 25 to 60% by weight. it is customary to use plasticizer oils for the preparation of sealing compounds, but they are not essential for the systems according to the invention. The plasticizer oil, if used, is preferably a polydimethylsiloxane oil end stopped with trimethylsiloxane and having a viscosity of from 30 to 10,000 mPas at 20° C. Silicone oils consisting of T-, D- and M- units and polymers of the type corresponding to the following formula

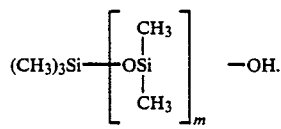

may also be used.

Precipitated and therefore exceptionally finely divided chalks with an average particle diameter below 0.5 μm, preferably below 0.1 μm, and rendered hydrophobic by being coated with carboxylic acids or silanes have proved to be the optimum reinforcing fillers. Stearic acid is particularly preferred, provided it is uniformly distributed and is at a concentration above 2.0% by weight. If the sealing compounds are to be colored white, a chalk with a high degree of whiteness and little color tinge should also be used.

For producing compositions which are stable under load, it is necessary to use from 30 to 55% by weight of chalk. If the chalk is very finely divided, sufficient stability is obtained at concentrations of 30% by weight and upwards but chalks having an average particle size above 0.1 μm must be added in quantities of up to 55% by weight. The stability under load is determined according to DIN 65 262, Part 3, at 23° C. and 50% relative humidity, the test being carried out on paste freshly applied to a vertical surface. After 30 minutes, a layer of paste 1 cm in thickness should not have descended by more than 1.5 mm.

If a chalk having the characteristics described above is used, it is not necessary to add any additives such as silicas for adjusting the stability. Additives of this type toughen the elastomer obtained after cross-linking and they make painting more difficult and the paint adheres less firmly.

Commercial chalks which have been precipitated in the conventional manner contain up to 1% by weight of water but exceptionally finely divided types of chalk contain even more. A low moisture content of the chalk is an important feature of the present invention. It should be less than 0.25% by weight, if possible below 0.15% by weight and if the quantity of chalk added lies in the upper limit then the moisture content should be as low as possible if the pastes obtained are to be stable in storage.

Removal of water from the filler may be carried out by drying the filler separately. In the case of chalks coated with stearic acid, this should as far as possible be carried out at a temperature below 120° C. The best drying apparatus for this purpose are e.g. vacuum conveyor belt dryers, vacuum drum dryers and microwave dryers. Atmospheric moisture must be strictly excluded during introduction of the dried chalk into the polymer as also during subsequent processing of the mixture. As an alternative to drying the filler separately, drying may be carried out on the system comprising the chalk, polymer and plasticizer oil. Apparatus designed for very thorough mixing and therefore efficient heat transfer are suitable for this purpose, e.g. mixing screws with vacuum segments.

For pastes prepared as described above, the titanic acid esters and carboxylic acid amido alkylalkoxy silicon compounds may be used at lower concentrations than those required for pastes prepared by the conventional method in planet mixers without drying. This reduction in the concentration of the aforesaid compounds not only reduces the cost of the systems but surprisingly also results in better mechanical properties of the sealing compounds. A reduction in the concentrations of the said compounds to below 4% by weight and preferably below 3% by weight reduces the elastic modulus and shore A hardness and increases the elongation at break, which are all desirable results.

The titanic acid esters used may be titanium tetraalkyl esters, dialkyl titanium dialkyl esters and other organic titanium esters containing chelate-forming groups as described e.g. in Patent application DE-PS 1 258 087. Di-i-butoxytitanium diacetoacetic acid ethyl ester chelate and di-i-propoxytitanium-bis-acetylacetonate are particularly preferred. Carboxylic acid amido alkylalkoxy silicon compounds may be used as cross-linking agents, e.g. the following:
di-N-methylbenzamido-methyl-ethoxy silane,
di-N-methylbenzamido-methyl-methoxy silane,
di-N-methylpropylamido-methyl-ethoxy silane,
mono-N-methylpropylamido-methyl-diethoxy silane,
di-N-methylpropylamido-methyl-methoxy silane,
di-N-methylcaprolactam-methyl-ethoxy silane and
di-N-methylcaprolactam-methyl-methoxy silane.

Di-N-methylbenzamido-methyl-ethoxy silane is a particularly preferred cross-linking agent.

The examples which follow serve to illustrate the present invention.

EXAMPLE 1

48.0 parts by weight of a precipitated chalk with an average particle diameter of 0.08 μm which has been treated with stearic acid are mixed for 15 minutes with exclusion of moisture into a mixture of 32.0 parts by weight of α,ω-dihydroxy-polydimethylsiloxane having a viscosity of 50,000 mPas and 13.3 parts by weight of α,ω-bis-(trimethylsiloxy)-polydimethylsiloxane having a viscosity of 100 mPas. The mixture is stirred in a vacuum at 2 mbar and 100° C. for 30 minutes and then cooled to a temperature below 40° C. 3.0 parts by weight of di-i-butoxytitanium diacetoacetic acid ethyl ester chelate are then added and the mixture is stirred in a vacuum for 20 minutes. 0.7 parts by weight of dibutyl tin dilaurate are then introduced with stirring for 5 minutes and 3.0 parts by weight of di-N-methylbenzamido-methyl-methoxy silane are finally stirred in and the mixture is evacuated for about 20 minutes.

The composition is filled into cartridges and stored with exclusion of moisture. The substance may be stored for at least half a year without any impairment to the properties of the paste or of the sealing compound when subsequently used.

The paste vulcanizes under the influence of atmospheric moisture to a silicone rubber which has the following mechanical properties:

| | |
|---|---|
| shore A hardness | 26 |
| E modulus 100% | 0.60 N/mm² |
| ultimate strength | 1.35 N/mm² |
| elongation at break | 400%. |

EXAMPLE 2

32.0 parts by weight of α,ω-dihydroxy-polydimethylsiloxane having a viscosity of 50,000 mPas and 13.5 parts by weight of α,ω-bis-(trimethylsiloxy)-polydimethylsiloxane having a viscosity of 100 mPas are mixed with 49.0 parts by weight of a precipitated chalk as in EXAMPLE 1 and dried. 2.2 parts by weight of di-i-butoxy-titanium diacetoacetic acid ethyl ester chelate are stirred into the cooled mixture (20 minutes), followed by 0.7 parts by weight of dibutyl tin dilaurate (5 minutes) and then 2.6 parts by weight of di-N-methylbenz-amido-methyl-methoxy silane (20 minutes) and the resulting mixture is evacuated for about 20 minutes. The resulting paste filled into cartridges can be stored for at least half a year with exclusion of atmospheric moisture without any loss of quality.

Mechanical properties of the silicone rubber prepared in the presence of atmospheric moisture:

| shore A hardness | 25 |
| --- | --- |
| E modulus 100% | 0.56 N/mm² |
| ultimate strength | 1.80 N/mm² |
| elongation at break | 810%. |

EXAMPLE 3

The polymer used is an α,ω-dihydroxy-polydimethylsiloxane having a viscosity of 80,000 mpas but the sealing compound is otherwise prepared exactly as in Example 2. The system obtained was again found to be stable in storage for more than half a year.

Mechanical properties of the sealing compound prepared in moist air:

| shore A hardness | 27 |
| --- | --- |
| E modulus 100% | 0.65 N/mm² |
| ultimate strength | 0.81 N/mm² |
| elongation at break | 660% |

EXAMPLE 4

40.5 parts by weight of α,ω-dihydroxy-polydimethylsiloxane having a viscosity of 50,000 mPas and 14.0 parts by weight of α,ω-bis-(trimethylsiloxy)-polydimethylsiloxane having a viscosity of 100 mPas are mixed with 40.0 parts by weight of a precipitated chalk as in Example 1 and the mixture is freed from water adhering to it by heating it to 100° C. in a vacuum for 30 minutes. When the mixture has cooled, 2.2 parts by weight of di-i-butoxy-titanium diacetoacetic acid ethyl ester chelate (20 minutes), 0.7 parts by weight of dibutyl tin dilaurate (5 minutes) and 2.6 parts by weight of di-N-methylbenzamino-methyl-ethoxy silane (20 minutes) are stirred in successively and the mixture is evacuated after each addition. The paste obtained is stable in storage for at least half a year with exclusion of atmospheric moisture.

Mechanical properties of the sealing compound prepared in moist air:

| shore A hardness | 22 |
| --- | --- |
| E modulus 100% | 0.43 N/mm² |
| ultimate strength | 1.80 N/mm² |
| elongation at break | 971% |

EXAMPLE 5

A sealing compound is prepared by the method of Example 4 except that the chalk is dried separately before its addition to the other starting materials (vacuum drying at 60° C. in a layer about 2 cm in height until constant weight is obtained). After the addition of the chalk with exclusion of atmospheric moisture. The reaction mixture is stirred until homogeneous (about 30 minutes) and then worked up as in Example 4.

A sealing compound which is stable for over half a year with exclusion of atmospheric moisture is again obtained. After vulcanization by atmospheric moisture, this compound has the following mechanical properties:

| shore A hardness | 21 |
| --- | --- |
| E modulus 100% | 0.41 N/mm² |
| ultimate strength | 1.89 N/mm² |
| elongation at break | 990% |

The mechanical properties of Examples 1 to 5 are based on DIN standard 53 505 (shore A hardness) and DIN 53 504 (standard rod). All the sealing compounds prepared were tested for their ability to be coated with lacquers.

After the onset of vulcanization under normal atmospheric conditions (23° C., 50% relative humidity), lacquers were applied at intervals of 24 hours, 48 hours and 7 days without any preliminary treatment of the surface of the sealing compound. Aherence of the lacquer was tested by the Boeing Test according to ASTM D 3359-70.

TABLE 1

Adherence of lacquer (Boeing Test according to ASTM D 3359-70) Application of the lacquer to the sealing compounds of Examples 1 to 5

| | 24 h | 48 h | 7 days | 4 weeks after onset of vulcanization |
| --- | --- | --- | --- | --- |
| White top coat lacquer based on alkyd resin | 100% | 100% | 100% | 100% |
| White top coat lacquer based on alkyd resin containing 1% of fungicide Preventol A 4 S ®[1] | 100% | 100% | 100% | 100% |
| Acrylic based brown top coat lacquer, aqueous emulsion | 100% | 100% | 100% | 100% |

[1]Trade product of Bayer AG, Leverkusen

What is claimed is:

1. A polydiorganosiloxane composition which is stable in storage with exclusion of moisture and which is curable with water or atmospheric air at ambient temperature to produce elastomers with a low modulus and high elongation and ultimate strength, said composition comprising a mixture of a α,ω-dihydroxypolydiorganosiloxane, a carboxylic acid amido alkylalkoxy silicon compound as cross-linking agent, a titanium chelate of a lower alkyl acid ester and a precipitated, hydrophobicized chalk whose residual moisture has been removed before contact with the chelate and cross-linking agent in the mixture.

2. A polydiorganosiloxane composition according to claim 1 wherein the precipitated chalk has an average particle diameter below 0.5 μm.

3. A polydiorganosiloxane composition according to claim 1 wherein the precipitated chalk has an average particle diameter below 0.1 μm.

4. A polydiorganosiloxane composition according to claim 1 wherein the chalk has been rendered hydrophobic with stearic acid.

5. A polydiorganosiloxane composition according to claim 1 wherein the proportion of chalk is from 30 to 55% by weight, based on the weight of the composition.

6. A polydiorganosiloxane composition according to claim 5 wherein the amount of chalk is from 40 to 50% by weight.

7. A polydiorganosiloxane composition according to claim 1 wherein the chalk is dehydrated to a moisture content below 0.25% by weight, based on the weight of the chalk.

8. A polydiorganosiloxane composition according to claim 7 wherein the chalk is dehydrated to a moisture content below 0.1% by weight.

9. A polydiorganosiloxane composition according to claim 1 wherein the cross-linking agent is di-N-methyl-benzamido-methyl-ethoxy silane.

10. A polydiorganosiloxane composition according to claim 1 wherein the mixture additionally contains a plasticizing polysiloxane.

11. A polydiorganosiloxane composition according to claim 10 wherein the plasticizing polysiloxane is an α,ω-bis-(tri-organylsiloxy)-polyorganosiloxane.

12. A polydiorganosiloxane composition according to claim 11 wherein the chalk has been dehydrated before or after they have been mixed with the α,ω-dihydroxy-polydiorganosiloxanes and α,ω-bis-(triorganylsiloxy)-polyorganosiloxanes.

13. A paintable joint sealing compound which contains a polydiorganosiloxane composition according to claim 1.

14. A paintable coating composition which contains a polydiorganosiloxane composition according to claim 1.

* * * * *